United States Patent
Baak

[15] 3,650,781
[45] Mar. 21, 1972

[54] SILICA-CADMIA GLASS BATCHES FOR PRODUCING LOW-TO-MEDIUM EXPANSION GLASSES

[72] Inventor: Nils Tryggve E. A. Baak, Ridgefield, Conn.
[73] Assignee: Owens-Illinois, Inc.
[22] Filed: Aug. 28, 1969
[21] Appl. No.: 853,960

Related U.S. Application Data

[63] Continuation-in-part of Ser. No. 465,741, June 21, 1965.

[52] U.S. Cl....................................................106/52, 106/54
[51] Int. Cl..............................................................C03c 3/04
[58] Field of Search..............................................106/52, 54

[56] References Cited

UNITED STATES PATENTS

| | | | |
|---|---|---|---|
| 2,326,059 | 8/1943 | Nordberg | 106/52 |
| 3,275,492 | 9/1966 | Herbert | 106/54 |
| 1,526,423 | 2/1925 | Keyes | 106/54 |
| 1,676,331 | 7/1928 | Hochstein | 106/54 |
| 3,326,703 | 6/1967 | Harrington | 106/54 |

OTHER PUBLICATIONS

Imaoka et al., Advances In Glass Technology– Plenum Press (1962) " Glass–Formation Range and Glass Structure" pp. 149– 155 TP845T52
Searle–Refractory Materials–Chas. Griffin & Co., London (1950), pp. 94– 96; 184– 185, TN67754
Levin et al.–Phase Diagrams For Ceramists–Amer. Ceramic Soc., Ohio, 1964, pp. 260– 262

Primary Examiner—Tobias E. Levow
Assistant Examiner—W. R. Satterfield
Attorney—Richard B. Dence and E. J. Holler

[57] ABSTRACT

Glass batch compositions for producing glasses having linear coefficients of thermal expansion in the range of from about $10 \times 10^{-7}$ to about $20 \times 10^{-7}$ in./in./° C. and which batch compositions are composed of finely divided batch materials consisting essentially of from 70–90 mole percent $SiO_2$, up 1 to 15 mole percent CdO, and the balance of such Composition, if any, being finely divided batch materials composed essentially of one or more oxides selected from the group consisting of $Al_2O_3$, $TiO_2$, $B_2O_3$, CuO, MnO, ZnO, $ZrO_2$, $Sb_2O_3$, $AlF_3$ and $P_2O_5$.

24 Claims, No Drawings

SILICA-CADMIA GLASS BATCHES FOR PRODUCING LOW-TO-MEDIUM EXPANSION GLASSES

The present invention is a continuation-in-part of copending application Ser. No. 465,741, filed June 21, 1965, now abandoned, and relates in general to glass batch compositions for producing glasses possessing low-to-medium coefficients of thermal expansion and having desirable melting temperatures, and more particularly to glass batch compositions for producing glasses based on silica and cadmium oxide by generally conventional glass batch melting procedures.

In the art of glass making, certain glasses are known that have good thermal expansion characteristics in the low-to-medium expansion range corresponding to a range of coefficients of linear expansion of from $10 \times 10^{-7}$ to $20 \times 10^{-7}$ in./in./° C. in the temperature range of from 0° to 300° C.. However, problems have arisen in connection with using these glasses because of the difficulty in melting glass batch compositions productive of such glasses without resort to excessively high batch melting temperatures or resort to expensive and complicated processing techniques such as vapor phase reactions in which production capabilities are so extremely limited and processing costs so high that such glasses have long been conventionally regarded as being outside the realm of practicability for commercial production of moderate cost glasses. In consequence, the practical applications of these glasses has been severely limited.

Therefore, it is an object of the present invention to provide low-to-medium expansion glasses which contain both silica and cadmium oxide and which are capable of being prepared directly from finely comminuted glass making batch materials in accordance with generally conventional glass batch melting procedures, and thus making such glasses available for a wide variety of uses heretofore considered to be economically impracticable.

It is a further object of the present invention to provide glass batch compositions for producing glasses possessing low-to-medium expansion properties and for producing such glasses from glass batch compositions at relatively low melting temperatures.

In attaining the above objectives, it is to be appreciated that one particularly significant feature of the present invention resides in providing glass batch compositions based on silica and cadmium oxide which at relatively low melting temperatures are productive of glasses having low-to-medium thermal expansion properties.

Another important feature of the present invention resides in providing glass batch compositions containing from about 70 to 90 mole percent silica, from 1 to 15 mole percent cadmium, and the remaining content of up to about 20 mole percent comprised of one or more additives, at which relatively low melting temperatures are suitable for producing glasses having low-to-medium thermal expansion properties.

A further feature of the present invention resides in the provision of relatively low melting temperature glass batch compositions for producing glasses comprising the $SiO_2$-$CdO$-$Al_2O_3$-$TiO_2$ system and accommodating one or more other selected, compatible oxides as additives.

A further salient feature of the present invention resides in the provision of relatively low melting temperature glass batch compositions for producing glasses comprising the $SiO_2$-$CdO$-$TiO_2$ system and accommodating one or more compatible glass batch additives.

Other objects, features and advantages of the present invention will become readily apparent to those ordinarily skilled in the art from the following detailed description thereof.

In accordance with certain of the broader aspects of the present invention, finely divided glass batch compositions are provided which are readily capable of being melted at relatively low melting temperatures to produce glasses predominantly composed of silica and cadmium oxide and which possess coefficients of thermal expansion generally within the low-to-medium range of about 10 to about $20 \times 10^{-7}$ in./in./° C. over the temperature range of from 0° to 300° C. In a more particular aspect, the glass batch compositions of the present invention comprise about 70–90 mole percent of finely divided silica together with up to about 15 mole percent of finely divided cadmium oxide and from 0–20 mole percent of finely divided compatible glass batch components.

The glass batch compositions of the present invention, in a further particular aspect, consist essentially of about 70–90 mole percent silica, up to about 15 mole percent cadmium oxide, and any balance being composed of one or more batch constituents such as titanium dioxide, boric oxide, aluminum trioxide, copper oxide, zinc oxide and manganese oxide; a source of boron and/or aluminum always being present to provide at least one mole percent of $B_2O_3$ or $Al_2O_3$ in the final glass.

For purposes of further modification, the glass batch compositions of the present invention may also contain selected amounts of other compatible glass batch constituents to an extent generally not exceeding about 20 mole percent. Representative of preferred compatible constituents are zirconium dioxide, aluminum fluoride and antimony trioxide, as well as other conventional glass batch constituents which do not tend to adversely affect the nature of the glass.

Included in the glass batch compositions of the present invention are those containing at least three of the following components, in mole percent, based on the total batch composition:

| Component | Mole Percent |
|---|---|
| $SiO_2$ | 70 to 90 |
| CdO | up to 15 |
| $Al_2O_3$ | 0 to 15 |
| $TiO_2$ | 0 to 10 |
| $B_2O_3$ | 0 to 10 |
| Copper Oxide | 0 to 10 |
| MnO | 0 to 10 |
| ZnO | 0 to 10 |

Preferred compositions coming within the scope of the compositions set forth above are, as follows:

| Component | Mole Percent |
|---|---|
| $SiO_2$ | 70 to 90 |
| CdO | 1 to 15 |
| $Al_2O_3$ | 3 to 10 |
| $TiO_2$ | 0 to 10 |
| $B_2O_3$ | 0 to 10 |
| Copper Oxide | 0 to 10 |
| MnO | 0 to 10 |
| ZnO | 0 to 10 |

Still other preferred compositions that come within the formulation set forth above are shown below, in mole percent:

| Component | Mole Percent |
|---|---|
| $SiO_2$ | 70 to 90 |
| CdO | 1 to 15 |
| $Al_2O_3$ | 3 to 10 |
| $TiO_2$ | 5 to 10 |
| $B_2O_3$ | 0 to 10 |
| CuO | 0 to 10 |
| MnO | 0 to 10 |
| ZnO | 0 to 10 |

In another aspect of the invention, the glasses of the present invention include those prepared from the following glass batch compositions in mole percent:

| Component | Mole Percent |
|---|---|
| $SiO_2$ | 70 to 90 |
| CdO | up to 15 |
| $Al_2O_3$ | 0 to 15 |
| $TiO_2$ | 0 to 10 |
| $B_2O_3$ | 0 to 10 |
| CuO | 0 to 10 |
| MnO | 0 to 10 |
| ZnO | 0 to 10 |
| $ZrO_2$ | 0 to 5 |
| $Sb_2O_3$ | 0 to 5 |
| $AlF_3$ | 0 to 18 |
| $P_2O_5$ | 0 to 5 | at least one member of the group $AlF_3$ and $Al_2O_3$ being present in the glass batch composition.

Particularly useful glass batch compositions encompassed by the present invention are shown below in mole percent.

| Component | Mole Percent |
|---|---|
| $SiO_2$ | not less than 70 |
| CdO | 3 to 10 |
| $Al_2O_3$ | 5 to 10 |
| $TiO_2$ | 5 to 10 |
| $B_2O_3$ | 4 to 5 |

Still further preferred compositions of the present invention are defined below in mole percent:

| Component | Mole Percent |
|---|---|
| $SiO_2$ | 70 to 85 |
| CdO | 1 to 10 |
| $Al_2O_3$ | 0 to 15 |
| $TiO_2$ | 5 to 10 |
| $B_2O_3$ | 0 to 5 |
| MnO | 0 to 5 |
| ZnO | 0 to 8 |
| CuO | 0 to 5 |
| $P_2O_5$ | 0 to 5 |

The following tables contain examples that further illustrate the present invention without limiting it in any way. All examples are expressed in terms of mole percent based upon the total glass batch composition.

TABLE I

| | | | | | | | | | |
|---|---|---|---|---|---|---|---|---|---|
| $SiO_2$ | 77.3 | 85.7 | 77.3 | 77.3 | 81.8 | 90.5 | 77.3 | 73.9 | 70.8 |
| CdO | 9.1 | 4.8 | 9.1 | 9.1 | 9.1 | 2.0 | 9.1 | 8.7 | 8.3 |
| $TiO_2$ | 4.5 | 4.8 | | | | 7.0 | | 4.3 | 4.2 |
| $B_2O_3$ | | | | | | 0.5 | 4.3 | | |
| $ZrO_2$ | | | 4.5 | 4.5 | | | | | |
| $Al_2O_3$ | 9.1 | 4.8 | 9.1 | 4.5 | 9.1 | | | 4.3 | |
| $AlF_3$ | | | | | | | 9.1 | 8.7 | 16.7 |
| $Sb_2O_3$ | | 4.5 | | | | | | | |

TABLE II

| | | | | | | | | | | | | | | |
|---|---|---|---|---|---|---|---|---|---|---|---|---|---|---|
| $SiO_2$ | 82.0 | 80.0 | 78.0 | 75.0 | 72.7 | 77.3 | 77.3 | 77.3 | 77.3 | 77.3 | 77.3 | 75.0 | 82.0 | 82.0 |
| CdO | 1.0 | 3.0 | 5.0 | 9.1 | 9.1 | 4.5 | 2.3 | 6.9 | 4.5 | 4.5 | 6.8 | 10.0 | 1.0 | 3.0 |
| $Al_2O_3$ | 6.5 | 6.5 | 6.5 | 9.1 | 9.1 | 9.1 | 9.1 | 9.1 | 9.1 | 9.1 | 9.1 | | | |
| $TiO_2$ | 6.0 | 6.0 | 6.0 | 6.8 | 9.1 | 4.5 | 4.5 | 4.4 | 4.5 | 4.5 | 4.5 | 5.0 | 6.0 | 6.0 |
| $B_2O_3$ | 4.5 | 4.5 | 4.5 | | | | | | | | | | 4.5 | 4.5 |
| $AlPO_4$ | | | | | | | | | | | | 10.0 | 6.5 | 6.5 |
| CuO | | | | | | 4.5 | | | | | | | | |
| ZnO | | | | | | | 6.8 | 2.3 | 4.5 | | | | | |
| MnO | | | | | | | | | | 4.5 | 2.3 | | | |

The ranges of batch constituents set forth in TABLES I and II above is summarized in TABLE III following:

TABLE III

| Component | Mole Percent |
|---|---|
| $SiO_2$ | 70.8 – 85.7 |
| CdO | 1.0 – 10.0 |
| $TiO_2$ | 0 – 9.1 |
| $B_2O_3$ | 0 – 4.5 |
| $ZrO_2$ | 0 – 4.5 |
| $Al_2O_3$ | 0 – 9.1 |
| $AlF_3$ | 0 – 16.7 |
| $AlPO_4$ | 0 – 10.0 |
| CuO | 0 – 4.5 |
| ZnO | 0 – 6.8 |
| MnO | 0 – 4.5 |
| $Sb_2O_3$ | 0 – 4.5 |

Additionally, it is important that, as will be observed from TABLES I and II, that each example contains, in addition to the basic $SiO_2$ and CdO constituents, at least one other constituent providing a necessary amount of either boron or aluminum from which $B_2O_3$ or $Al_2O_3$ may be formed in the ultimate glasses resulting from the batch compositions of this invention. For example, in each example boron is present or aluminum is present. In the case of boron, the preferred source is $B_2O_3$. In the case of aluminum, the preferred sources are $Al_2O_3$, $AlPO_4$ or $AlF_3$.

In each instance the batch compositions of this invention were capable of being readily melted at 1,600° C. in conventional manner in platinum or ceramic crucibles to produce a desirable glass having a coefficient of thermal expansion in the low-to-medium range of $10 \times 10^{-7}$ to $20 \times 10^{-7}$ in./in./°C. over the temperature range of from 0° to 300° C.

The following table contains data relating the coefficient of linear thermal expansion with each of several representative glasses of the invention.

TABLE IV

| | | | | | | |
|---|---|---|---|---|---|---|
| $\alpha \times 10^{+7}$ (0–300° C.) | 16.4 | 17.8 | 15.7 | 13.6 | 16.9 | 17.4 |
| $SiO_2$ | 77.3 | 75.0 | 77.3 | 77.3 | 77.3 | 77.3 |
| CdO | 9.1 | 9.1 | 2.3 | 6.9 | 4.5 | 6.8 |
| $Al_2O_3$ | 9.1 | 9.1 | 9.1 | 9.1 | 9.1 | 9.1 |
| $TiO_2$ | 4.5 | 6.8 | 4.4 | 4.4 | 4.5 | 4.5 |
| ZnO | | 6.8 | 2.3 | 4.5 | | |
| MnO | | | | | | 2.3 |

In the preparation of the above examples, various size batches were made including samples of 100 grams in weight. Any suitable source of high purity raw materials can be used, and it will be readily apparent that only minor amounts of ingredients in the nature of impurities can be introduced into the compositions.

The components of the glass compositions of the present invention can be introduced in any suitable form such as but not limited to oxides, nitrates, carbonates, etc.

Melts were generally made in platinum crucibles, platinum-rhodium being well suited for this operation. Electric furnaces were used and the melt held for several hours to ensure homogeneity, freedom from bubbles, etc.

Although the emphasis in the foregoing examples and discussion has been with regard to glasses containing up to 15 mole percent CdO, the upper limit can be extended.

Generally, the glasses prepared from the glass batch compositions of the present invention are characterized by a low-to-medium thermal expansion. The coefficient of linear thermal expansion of representative glasses ranges from about 10 to about 2. $\times 10^{-7}$ (0°–300° C.). However, this range of thermal expansion is by no means intended to be restrictive or limiting of the compositions. Coefficients of thermal expansion both above and below the above values can be obtained by selection of components, and therefore such variations are intended to be encompassed by the present invention.

Among the many useful and practical applications for the glasses of the present invention are applications such as laboratory ware, cook ware, as well as optical instruments, and solder glasses.

It will be understood that various other modifications will be apparent to and can be readily made by those skilled in the art without departing from the scope and spirit of this invention.

I claim: characterized
1. A glass batch composition for producing a glass having a linear coefficient of thermal expansion within the range of from about $10 \times 10^{-7}$ to $20 \times 10^{-7}$ in./in./° C. over the range of from 0°–300° C., and having a composition consisting essentially of 70 to 90 mole percent $SiO_2$, 1 to 15 mole percent CdO, and the remaining balance of said glass batch composition consisting essentially of at least one of the following constituents in the indicated ranges of mole percents:

| Constituents | Mole Percent |
|---|---|
| $TiO_2$ | 0–10 |
| $Al_2O_3$ | 3–10 |
| $B_2O_3$ | 0–10 |

| Constituent | |
|---|---|
| CuO | 0–10 |
| MnO | 0–10 |
| ZnO | 0–10 |
| ZrO$_2$ | 0–5 |
| Sb$_2$O$_3$ | 0–5 |
| AlF$_3$ | 0–18 |
| P$_2$O$_5$ | 0–5. |

2. A glass batch composition, as defined in claim 1, wherein said SiO$_2$, CdO, Al$_2$O$_3$, TiO$_2$ and B$_2$O$_3$ are present in said composition in about the following mole percents:

| Constituent | Mole Percent |
|---|---|
| SiO$_2$ | 82.0 |
| CdO | 1.0 |
| Al$_2$O$_3$ | 6.5 |
| TiO$_2$ | 6.0 |
| B$_2$O$_3$ | 4.5 |

3. A glass batch composition, as defined in claim 1, wherein said SiO$_2$, CdO, Al$_2$O$_3$, TiO$_2$ and B$_2$O$_3$ are present in said composition in about the following mole percents:

| Constituent | Mole Percent |
|---|---|
| SiO$_2$ | 80.0 |
| CdO | 3.0 |
| Al$_2$O$_3$ | 6.5 |
| TiO$_2$ | 6.0 |
| B$_2$O$_3$ | 4.5. |

4. A glass batch composition, as defined in claim 1, wherein said SiO$_2$, CdO, Al$_2$O$_3$ and TiO$_2$ are present in said composition in about the following mole percents:

| Constituent | Mole Percent |
|---|---|
| SiO$_2$ | 75.0 |
| CdO | 9.1 |
| Al$_2$O$_3$ | 9.1 |
| TiO$_2$ | 6.8 |

5. A glass batch composition, as defined in claim 1, wherein said SiO$_2$, CdO, Al$_2$O$_3$ and TiO$_2$ are present in said composition in about the following mole percents:

| Constituent | Mole Percent |
|---|---|
| SiO$_2$ | 72.7 |
| CdO | 9.1 |
| Al$_2$O$_3$ | 9.1 |
| TiO$_2$ | 9.1 |

6. A glass batch composition, as defined in claim 1, wherein said SiO$_2$, CdO, Al$_2$O$_3$, TiO$_2$ and CuO are present in said composition in about the following mole percents:

| Constituent | Mole Percent |
|---|---|
| SiO$_2$ | 77.3 |
| CdO | 4.5 |
| Al$_2$O$_3$ | 9.1 |
| TiO$_2$ | 4.5 |
| CuO | 4.5 |

7. A glass batch composition, as defined in claim 1, wherein said SiO$_2$, CdO, Al$_2$O$_3$, TiO$_2$ and ZnO are present in said composition in about the following mole percents:

| Constituent | Mole Percent |
|---|---|
| SiO$_2$ | 77.3 |
| CdO | 2.3 – 6.9 |
| Al$_2$O$_3$ | 9.1 |
| TiO$_2$ | 4.4 – 4.5 |
| ZnO | 2.3 – 6.8 |

8. A glass batch composition, as defined in claim 1, wherein said SiO$_2$, CdO, Al$_2$O$_3$, TiO$_2$ and ZnO are present in said composition in about the following mole percents:

| Constituent | Mole Percent |
|---|---|
| SiO$_2$ | 77.3 |
| CdO | 2.3 |
| Al$_2$O$_3$ | 9.1 |
| TiO$_2$ | 4.5 |
| ZnO | 6.8 |

9. A glass batch composition, as defined in claim 1, wherein said SiO$_2$, CdO, Al$_2$O$_3$, TiO$_2$ and ZnO are present in said composition in about the following mole percents:

| Constituent | Mole Percent |
|---|---|
| SiO$_2$ | 77.3 |
| CdO | 6.9 |
| Al$_2$O$_3$ | 9.1 |
| TiO$_2$ | 4.4 |
| ZnO | 2.3 |

10. A glass batch composition, as defined in claim 1, wherein said SiO$_2$, CdO, Al$_2$O$_3$, TiO$_2$ and ZnO are present in said composition in about the following mole percents:

| Constituent | Mole Percent |
|---|---|
| SiO$_2$ | 77.3 |
| CdO | 4.5 |
| Al$_2$O$_3$ | 9.1 |
| TiO$_2$ | 4.5 |
| ZnO | 4.5 |

11. A glass batch composition, as defined in claim 1, wherein said SiO$_2$, CdO, Al$_2$O$_3$, TiO$_2$ and MnO are present in said composition in about the following mole percents:

| Constituent | Mole Percent |
|---|---|
| SiO$_2$ | 77.3 |
| CdO | 4.5 – 6.8 |
| Al$_2$O$_3$ | 9.1 |
| TiO$_2$ | 4.5 |
| MnO | 2.3 – 4.5 |

12. A glass batch composition, as defined in claim 1, wherein said SiO$_2$, CdO, Al$_2$O$_3$, TiO$_2$ and MnO are present in said composition in about the following mole percents:

| Constituent | Mole Percent |
|---|---|
| SiO$_2$ | 77.3 |
| CdO | 4.5 |
| Al$_2$O$_3$ | 9.1 |
| TiO$_2$ | 4.5 |
| MnO | 4.5 |

13. A glass batch composition, as defined in claim 1, wherein said SiO$_2$, CdO, Al$_2$O$_3$, TiO$_2$ and MnO are present in said composition in about the following mole percents:

| Constituent | Mole Percent |
|---|---|
| SiO$_2$ | 77.3 |
| CdO | 6.8 |
| Al$_2$O$_3$ | 9.1 |
| TiO$_2$ | 4.5 |
| MnO | 2.3 |

14. A glass batch composition, as defined in claim 1, wherein said SiO$_2$, CdO, Al$_2$O$_3$ and TiO$_2$ are present in said composition in about the following mole percents:

| Constituent | Mole Percent |
|---|---|
| SiO$_2$ | 77.3 – 85.7 |
| CdO | 4.8 – 9.1 |
| Al$_2$O$_3$ | 4.8 – 9.1 |
| TiO$_2$ | 4.5 – 4.8 |

15. A glass batch composition, as defined in claim 1, wherein said SiO$_2$, CdO, Al$_2$O$_3$ and TiO$_2$ are present in said composition in about the following mole percents:

| Constituent | Mole Percent |
|---|---|
| SiO$_2$ | 77.3 |
| CdO | 9.1 |
| Al$_2$O$_3$ | 9.1 |
| TiO$_2$ | 4.5 |

16. A glass batch composition, as defined in claim 1, wherein said SiO$_2$, CdO, Al$_2$O$_3$ and TiO$_2$ are present in said composition in about the following mole percents:

| Constituent | Mole Percent |
|---|---|
| SiO$_2$ | 85.7 |
| CdO | 4.8 |
| Al$_2$O$_3$ | 4.8 |

TiO₂     4.8

17. A glass batch composition, as defined in claim 1, wherein said SiO₂, CdO, ZrO₂, Al₂O₃ and Sb₂O₃ are present in said composition in about the following mole percents:

| Constituent | Mole |
|---|---|
| SiO₂ | 77.3 |
| CdO | 9.1 |
| ZrO₂ | 4.5 |
| Al₂O₃ | 4.5 |
| Sb₂O₃ | 4.5 |

18. A glass batch composition, as defined in claim 1, wherein said SiO₂, CdO and Al₂O₃ are present in said composition in about the following mole percents:

| Constituent | Mole Percent |
|---|---|
| SiO₂ | 81.8 |
| CdO | 9.1 |
| Al₂O₃ | 9.1 |

19. A glass batch composition, as defined in claim 1, wherein said SiO₂, CdO, B₂O₃ and AlF₃ are present in said composition in about the following mole percents:

| Constituent | Mole Percent |
|---|---|
| SiO₂ | 77.3 |
| CdO | 9.1 |
| B₂O₃ | 4.3 |
| AlF₃ | 9.1 |

2. A glass batch composition, as defined in claim 1, wherein said SiO₂, CdO, Al₂O₃, TiO₂ and AlF₃ are present in said composition in about the following mole percents:

| Constituent | Mole Percent |
|---|---|
| SiO₂ | 73.9 |
| CdO | 8.7 |
| Al₂O₃ | 4.3 |
| TiO₂ | 4.3 |
| AlF₃ | 8.7 |

21. A glass batch composition, as defined in claim 1, wherein said SiO₂, CdO, TiO₂ and AlF₃ are present in said composition in about the following mole percents:

| Constituent | Mole Percent |
|---|---|
| SiO₂ | 70.8 |
| CdO | 8.3 |
| TiO₂ | 4.2 |
| AlF₃ | 16.7 |

22. A glass batch composition for producing a glass having a linear coefficient of thermal expansion within the range of from about $10 \times 10^{-7}$ to $20 \times 10^{-7}$ in./in./° C. over the range of from 0°–300° C., said glass batch composition being capable of being melted at 1,600° C. and having a composition consisting essentially of 70 to 90 mole percent SiO₂, from 1 to 15.0 mole percent CdO, and the remaining balance of said glass batch composition consisting essentially of the following constituents in the indicated ranges of mole percents:

| Constituents | Mole Percent |
|---|---|
| TiO₂ | 5–10 |
| B₂O₃ | 0–4.5 |
| ZrO₂ | 0–4.5 |
| Al₂O₃ | 3–10 |
| AlF₃ | 0–16.7 |
| AlPO₄ | 0–10.0 |
| CuO | 0–4.5 |
| ZnO | 0–6.8 |
| MnO | 0–4.5 |
| Sb₂O₃ | 0–4.5 |

23. A glass batch composition for producing a glass having a linear coefficient of thermal expansion within the range of from about $10 \times 10^{-7}$ to $20 \times 10^{-7}$ in./in./° C. over the range of from 0°–300° C., said glass batch composition being capable of being melted at 1,600° C., and having a composition consisting essentially of 70 to 90 mole percent SiO₂, 1 to 15 mole percent CdO and the remaining balance of the glass batch composition consisting of the following constituents in the indicated range of mole percent:

| Constituents | Mole Percent |
|---|---|
| TiO₂ | 5–10 |
| Al₂O₃ | 3–10 |
| B₂O₃ | 0–10 |
| CuO | 0–10 |
| MnO | 0–10 |
| ZnO | 0–10 |
| ZrO₂ | 0–5 |
| Sb₂O₃ | 0–5 |
| AlF₃ | 0–18 |
| P₂O₅ | 0–5 |

24. A glass batch composition for producing a glass as defined in claim 28 wherein said glass batch composition consists essentially of 70 to 90 mole percent SiO₂, from 3.0 to 10.0 mole percent CdO and the remaining balance of said glass batch composition consists essentially of the following constituents in the indicated ranges of mole percent:

| Constituents | Mole Percent |
|---|---|
| Al₂O₃ | 5–10 |
| TiO₂ | 5–10 |
| B₂O₃ | 4–5 |
| ZrO₂ | 0–5 |
| AlF₃ | 0–18 |
| CuO | 0–10 |
| ZnO | 0–10 |
| MnO | 0–10 |
| Sb₂O₃ | 0–5 |
| P₂O₅ | 0–5 |

* * * * *

UNITED STATES PATENT OFFICE
CERTIFICATE OF CORRECTION

Patent No. 3,650,781      Dated March 21, 1972

Inventor(s) NILS TRYGGVE E.A. BAAK

It is certified that error appears in the above-identified patent and that said Letters Patent are hereby corrected as shown below:

Abstract, Col. 2, line 5, after "up" delete "1"; Abstract, Col. 2, line 6, "Composition" should be ---composition---. Col. 1, line 4, after "1965" insert ---and---; Col. 1, line 51, after "," "at which" should be ---which at---. Col. 4, line 49, "2." should be ---20---. Col. 7, claim "2" should be claim ---20---. Col. 8, claim 24, line 2, "28" should be ---23---.

Signed and sealed this 10th day of April 1973.

(SEAL)
Attest:

EDWARD M. FLETCHER, JR.
Attesting Officer

ROBERT GOTTSCHALK
Commissioner of Patents